(12) United States Patent
Heath et al.

(10) Patent No.: US 10,859,427 B2
(45) Date of Patent: Dec. 8, 2020

(54) DIAGNOSTIC SIGNAL TO ANNUNCIATE PRIMARY SEAL FAILURE IN A LEVEL TRANSMITTER

(71) Applicant: Honeywell International Inc., Morris Plains, NJ (US)

(72) Inventors: Stuart James Heath, Morris Plains, NJ (US); Michael Kon Yew Hughes, Morris Plains, NJ (US); Ion Georgescu, Morris Plains, NJ (US); Cornel Cobianu, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 116 days.

(21) Appl. No.: 15/532,148

(22) PCT Filed: Nov. 25, 2015

(86) PCT No.: PCT/US2015/062593
§ 371 (c)(1),
(2) Date: Jun. 1, 2017

(87) PCT Pub. No.: WO2016/089689
PCT Pub. Date: Jun. 9, 2016

(65) Prior Publication Data
US 2017/0268922 A1    Sep. 21, 2017

(30) Foreign Application Priority Data
Dec. 1, 2014 (EP) .................................. 14195713

(51) Int. Cl.
*G01F 25/00* (2006.01)
*G01S 7/40* (2006.01)
(Continued)

(52) U.S. Cl.
CPC ........ *G01F 25/0061* (2013.01); *G01F 23/284* (2013.01); *G01M 3/00* (2013.01);
(Continued)

(58) Field of Classification Search
None
See application file for complete search history.

(56) References Cited

U.S. PATENT DOCUMENTS 4,835,522 A * 5/1989 Andrejasich ............ G01M 3/32
340/521
5,872,494 A   2/1999 Palan et al.
(Continued)

FOREIGN PATENT DOCUMENTS

| EP | 2 667 163 A1 | 11/2013 |
| WO | 9825109 A2 | 6/1998 |
| WO | 2005038414 A1 | 4/2005 |

*Primary Examiner* — Whitney Moore

(57) ABSTRACT

A method and system for seal failure annunciation comprises a process connector connected to a probe used to measure a product level in a tank. A pulse generation module generates a pulse that is propagated through a voided space in the process connector and a detector module configured to receive the echo curve from the interrogation pulse. A logic module is used to evaluate the received echo curve to determine if a seal in the process connector has failed. When the logic module indicates seal failure, an alarm module initiates an alarm indicating said seal in said process connector has failed.

13 Claims, 6 Drawing Sheets

(51) Int. Cl.
  *G01F 23/284*     (2006.01)
  *G08B 21/18*      (2006.01)
  *G01S 13/10*      (2006.01)
  *G01S 13/88*      (2006.01)
  *G08B 5/36*       (2006.01)
  *G01M 3/00*       (2006.01)
  *G08B 7/06*       (2006.01)

(52) U.S. Cl.
  CPC ............ *G01S 7/4004* (2013.01); *G01S 13/10* (2013.01); *G01S 13/88* (2013.01); *G08B 5/36* (2013.01); *G08B 7/06* (2013.01); *G08B 21/182* (2013.01); *G08B 21/187* (2013.01)

(56) References Cited

U.S. PATENT DOCUMENTS

| | | | |
|---|---|---|---|
| 5,877,663 A | 3/1999 | Palan et al. | |
| 6,101,873 A | 8/2000 | Kawakatsu et al. | |
| 6,642,807 B1 | 11/2003 | Gard | |
| 6,867,729 B2 | 3/2005 | Berry et al. | |
| 7,255,002 B2 | 8/2007 | Gravel et al. | |
| 7,865,317 B2 | 1/2011 | Begin | |
| 8,842,039 B2 | 9/2014 | Fredriksson et al. | |
| 9,279,705 B2 | 3/2016 | Janitch | |
| 9,383,246 B2 | 7/2016 | Hagglund | |
| 9,476,753 B2 | 10/2016 | Georgescu et al. | |
| 9,502,811 B1 | 11/2016 | Halliburton | |
| 9,541,444 B2 | 1/2017 | Kleman | |
| 9,574,929 B2 | 2/2017 | Cobianu et al. | |
| 9,618,612 B2 | 4/2017 | Muldowney | |
| 9,618,617 B2 | 4/2017 | Nawrocki | |
| 2005/0017896 A1 | 1/2005 | Klofer et al. | |
| 2006/0225499 A1 | 10/2006 | Gravel et al. | |
| 2010/0231438 A1 | 9/2010 | Ohlsson et al. | |
| 2011/0210858 A1* | 9/2011 | White | G01M 3/26 340/606 |
| 2013/0069795 A1* | 3/2013 | Wenger | G01F 23/284 340/870.01 |
| 2014/0103950 A1 | 4/2014 | Janitch | |
| 2015/0168201 A1 | 6/2015 | Cobianu et al. | |
| 2015/0276458 A1 | 10/2015 | Cobianu et al. | |
| 2015/0276460 A1 | 10/2015 | Georgescu et al. | |
| 2015/0323938 A1 | 11/2015 | Levy et al. | |
| 2017/0089745 A1 | 3/2017 | Hershey et al. | |

\* cited by examiner

DIAGNOSTIC SIGNAL TO ANNUNCIATE PRIMARY SEAL FAILURE IN A LEVEL TRANSMITTER

CROSS REFERENCE TO RELATED APPLICATIONS

This application is the US national phase of International Application No. PCT/US2015/062593, filed on Nov. 25, 2015 under the PCT (Patent Cooperation Treaty), and claims priority to European Application No. 14195713.4, filed on Dec. 1, 2014. The entire contents of these applications are incorporated herein by reference.

FIELD OF THE INVENTION

Embodiments are generally related to the field of level measurements. Embodiments are also related to methods and systems for annunciating seal failures in level measuring devices. Embodiments are further related to methods and systems for annunciating seal failure in dual seal devices associated with level measurement devices using guided wave radar.

BACKGROUND

Level measurement using guided wave radar is used in a vast number of applications. Level measuring devices are used to measure products ranging from relatively safe products like water or grain, to highly dangerous materials like ammonia or petrochemicals.

A level transmitter is a 2-wire device that is powered by, and communicates over, a pair of cables delivered to it from a control room by conduit. A guided wave radar probe may be used in applications that require direct contact with the process. As such, a robust seal is required to isolate the process from the electronics housing. If the seal were to fail, the housing of the level gauge could quickly fill and start to flood the conduit with dangerous materials.

For this reason, many applications require the use of a "dual seal" mechanism within a process connector. The purpose of the dual seal is to provide a secondary seal in case of primary seal failure. A means of annunciating the primary seal failure is generally required. This can be visible (e.g., via visible leakage), a whistle, or other means. Specific requirements for such annunciation are listed, for example, in The Canadian Electrical Code (2012), Rule 18-072 and the National Electrical Code (2011), Rules 501.17 and 505.26; also in ANSI/ISA-12.27.01-2003 (or 2011), and "Requirements for Process Sealing between Electrical Systems and Flammable or Combustible Process Fluids."

Because a process connection may involve dangerous materials and because a leak may have dangerous or destructive results, a need exists for a secondary annunciation when a seal is breached as described herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide alarm methods and systems.

It is another aspect of the disclosed embodiments to provide a method and system for annunciating seal failures.

It is yet another aspect of the disclosed embodiments to provide an enhanced method and system for diagnosing seal failures in level measuring devices and annunciating seal failures.

The aforementioned aspects and other objectives and advantages can now be achieved as described herein. A method and system for seal failure annunciation comprises a process connector connected to a probe used to measure a product level in a tank. A pulse generation module generates an interrogation pulse that is propagated through a voided space in the process connector and a detector module is configured to receive the echo curve from the interrogation pulse. A logic module is used to evaluate the echo curve to determine if a seal in the process connector has failed. When the logic module indicates seal failure, an alarm module initiates an alarm indicating the seal in the process connector has failed.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
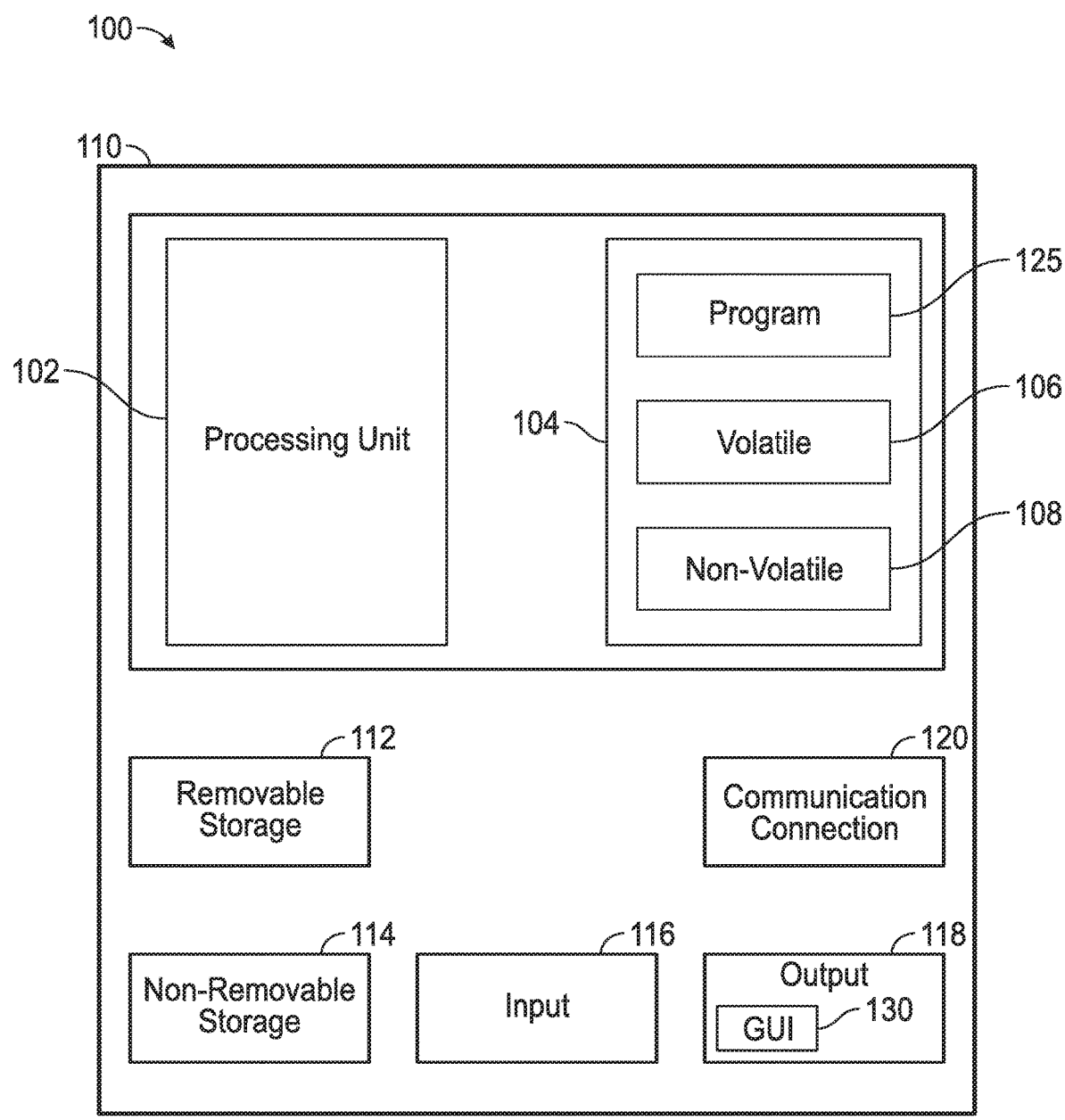
FIG. 1 illustrates a block diagram of a computer system which is implemented, in accordance with the disclosed embodiments.
Figure 2:
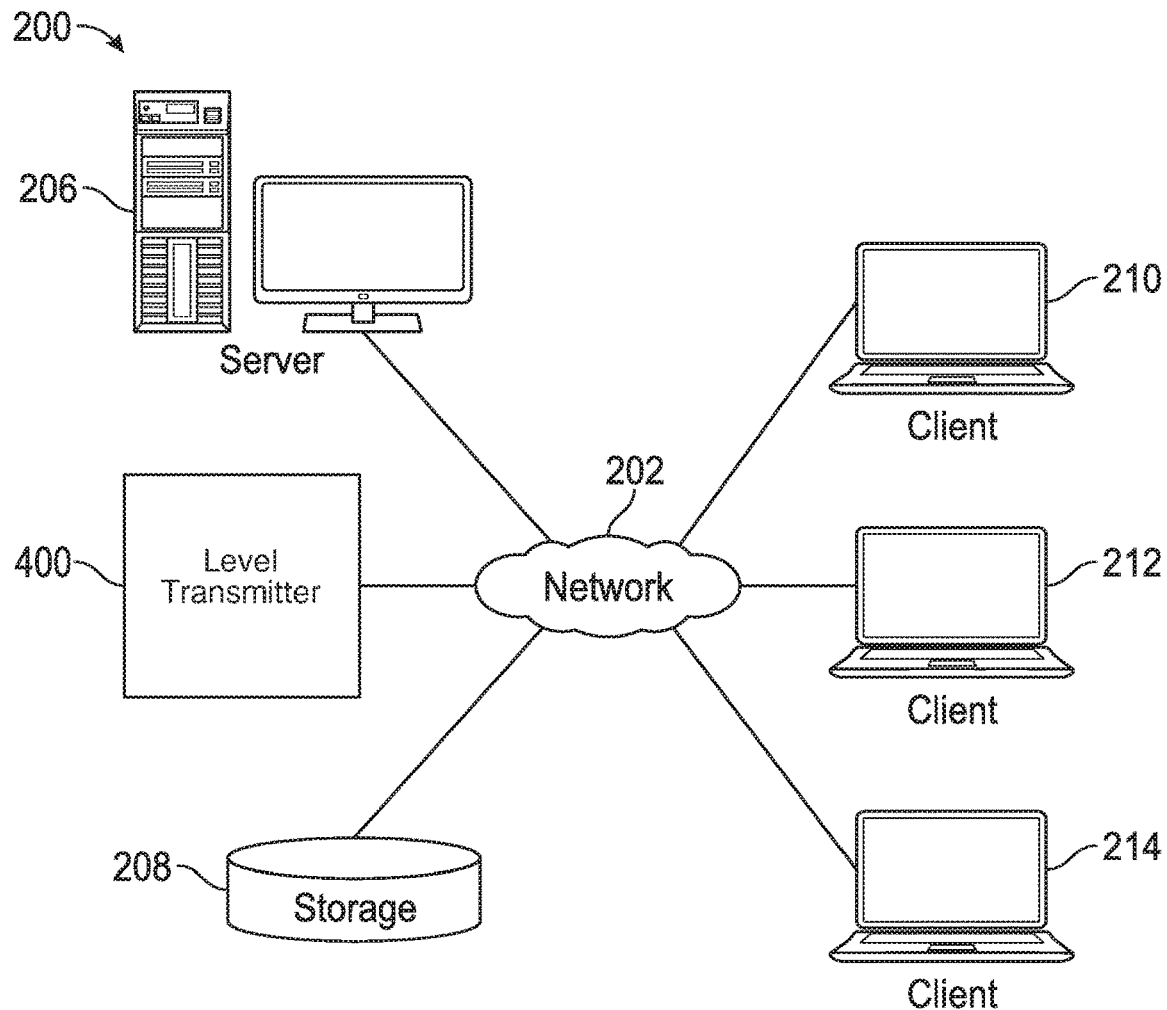
FIG. 2 illustrates a graphical representation of a network of data-processing devices in which aspects of the present invention may be implemented.
Figure 3:
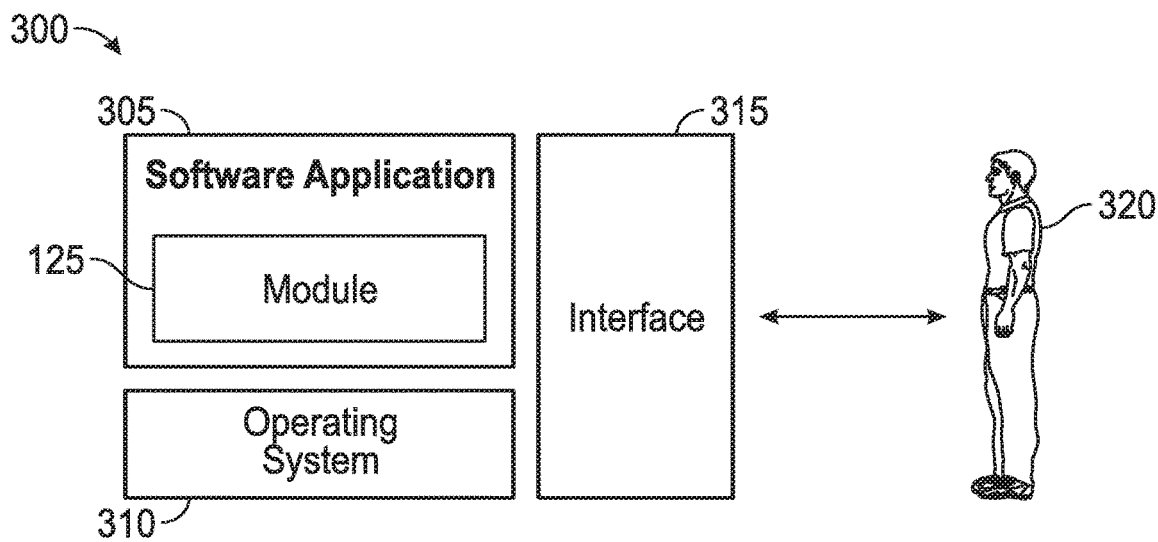
FIG. 3 illustrates a computer software system for directing the operation of the data-processing system depicted in FIG. 1, in accordance with the disclosed embodiments.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors and other elements disclosed herein may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable non-transitory instructions as well as data including data regarding level measurements or seal failure data.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a level transmitter. The communication connection may include a Local Area Network (LAN), a Wide Area Network (WAN) or other networks. This functionality is described in more fully in the description associated with FIG. 2 below.

Output 118 is most commonly provided as a computer monitor, but may include any output device, Output 118 may also include a data collection apparatus associated with computer system 110 such as a level transmitter. In addition, input 116, which commonly includes a computer keyboard and/or pointing device such as a computer mouse, computer track pad, or the like, allows a user to select and instruct computer system 110. Input 116 may also receive input for a device such as a level transmitter, A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display level transmitter data or provide seal failure alerts as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables, Network 202 can further communicate with one or more servers 206, one or more external devices such as a level transmitter 400, and a memory storage unit such as, for example, memory or database 208.

In the depicted example, level transmitter 400 and server 206 connect to network 202 along with storage unit 208. In addition, clients 210, 212, and 214 connect to network 202, These clients 210, 212, and 214 may be, for example, personal computers or network computers. Computer system 110 depicted in FIG. 1 can be, for example, a client such as client 210, 212, and/or 214. Alternatively clients 210, 212, and 214 may also be, for example, a level transmitter, or other such device.

Computer system 110 can also be implemented as a server such as server 206, depending upon design considerations. In the depicted example, server 206 provides data such as boot files, operating system images, applications, and application updates to clients 210, 212, and 214, and/or to level transmitter 400. Clients 210, 212, and 214 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 110 depicted in FIG. 1. Software application 305 may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 114 into the memory 104) for execution by the data-processing system 110. The data-processing system 110 can receive user commands and data through user interface 315, which can include input 116 and output 118, accessible by a user 320. These inputs may then be acted upon by the computer system 110 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTAS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of a data-processing system such as computer system 110, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

The embodiments disclosed herein provide methods and systems for detecting and annunciating a seal failure in guided wave radar level transmitters and their associated control systems.

Figure 4:
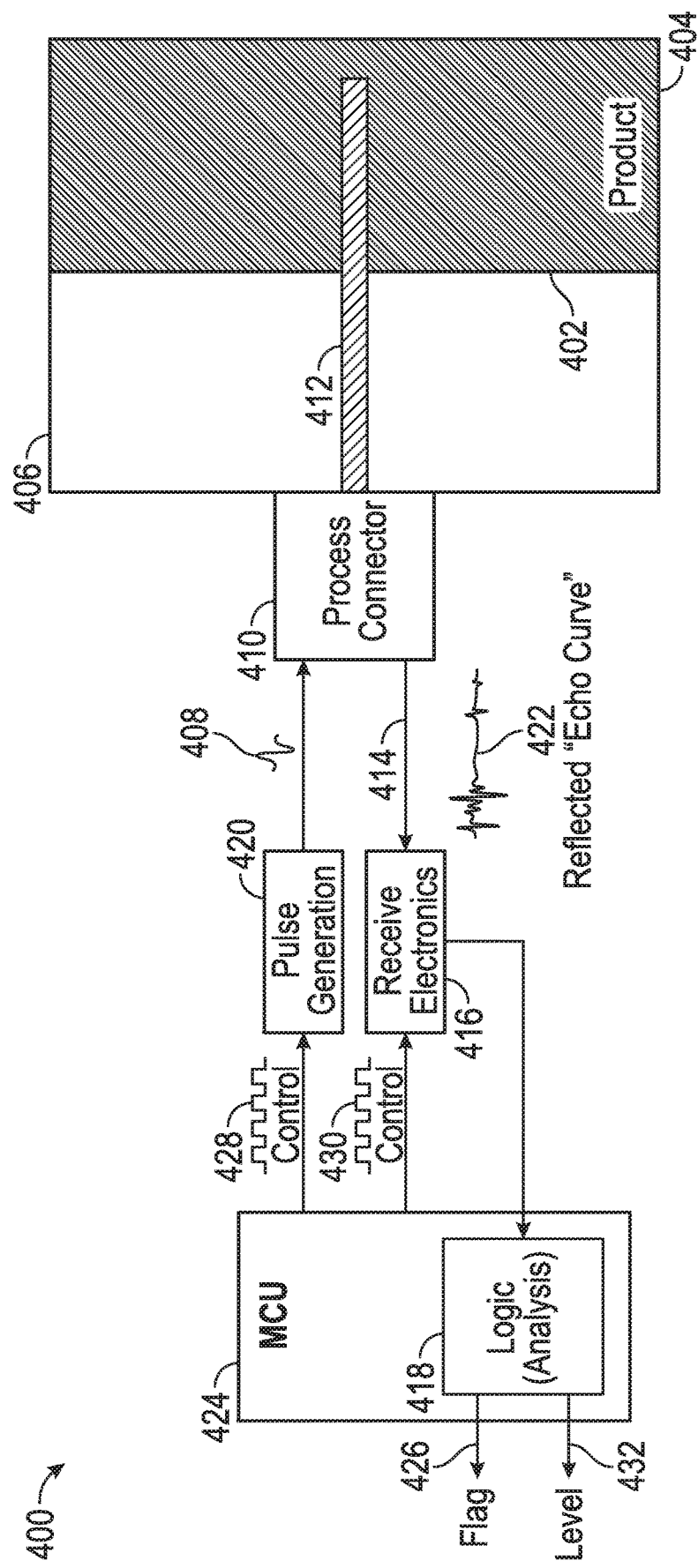
FIG. 4 illustrates a block diagram of a system for annunciating seal failure, in accordance with the disclosed embodiments.

FIG. 4 illustrates a block diagram of one embodiment of a level transmitter system 400 for detecting and annunciating a seal failure in a level transmitter using guided wave radar. In general, a level transmitter 400 is used to measure the level 402 of a product 404 in a tank 406. The level transmitter 400 generally operates by sending an input or interrogation pulse 408 via a transmission line (or coaxial cable) through the process connector 410 into the tank 406. In a coaxial cable, the impedance of the cable is set by the physical construction of the cable such as the inner conductor diameter, the outer conductor diameter, and the dielectric constant of the material in between. Similarly, as the voided space in the process connector 410 fills with a material other than air, the impedance of this region of the process connector changes. This impedance change causes reflections and power loss that present themselves as structures in the echo curve 422. Equivalent time sampling is used to map the resulting echo curve. Thus, the echo curve is a time-based sample of the reflections from the pulse encountering impedance changes in the process connector 410 and/or tank 406.

The process connector 410 is a device that is installed on the tank 406 at an opening in the tank 406. The process connector 410 includes a probe 412 that extends from the process connector 410 into the tank 406 and into product 404. The input pulse 408 travels through the probe 412 and then is reflected back through the process connector 410 as an output pulse 414. The output pulse 414 is transmitted from the process connector 410 to a receiver 416 and then to logic unit 418 associated with a master control unit (MCU) 424. The logic unit evaluates the output pulse 414 to determine the level 402 of the product 404 in the tank 406. In a preferred embodiment, this is achieved using equivalent time sampling. Logic unit 418 can provide level data 432 to an external device such as computer system 100. This type of level meter system is called a guided wave radar level transmitter.

Level transmitter systems such as level transmitter system 400 can be used for a variety of applications. Some of these applications are for relatively innocuous products 404 such as water or grain. However, level transmitter system 400 can also be used to measure dangerous or reactive products 404 such as combustibles, radioactive material, petrochemicals, etc. In such applications, a leak through the level transmitter 400 into the connecting conduit to the control room can be very dangerous.

In one embodiment, level transmitter system 400 can take advantage of input or interrogation pulse 408 to determine if a leak exists in process connector 410. Pulse generator 420 can create an input pulse, or a series of input pulses 408, Input pulse 408 can then travel through the voided area in the process connector 410. The input pulse 408 reflects out of process connector 410 as a reflection that is detected at receiver 416. Equivalent time sampling can be used to generate an echo curve 422. Echo curve 422 is transmitted to a logic unit 418 associated with an MCU 424. MCU 424 can also provide a control signal 428 to pulse generator 420, and a control signal 430 to receiver 416.

Figure 8A:
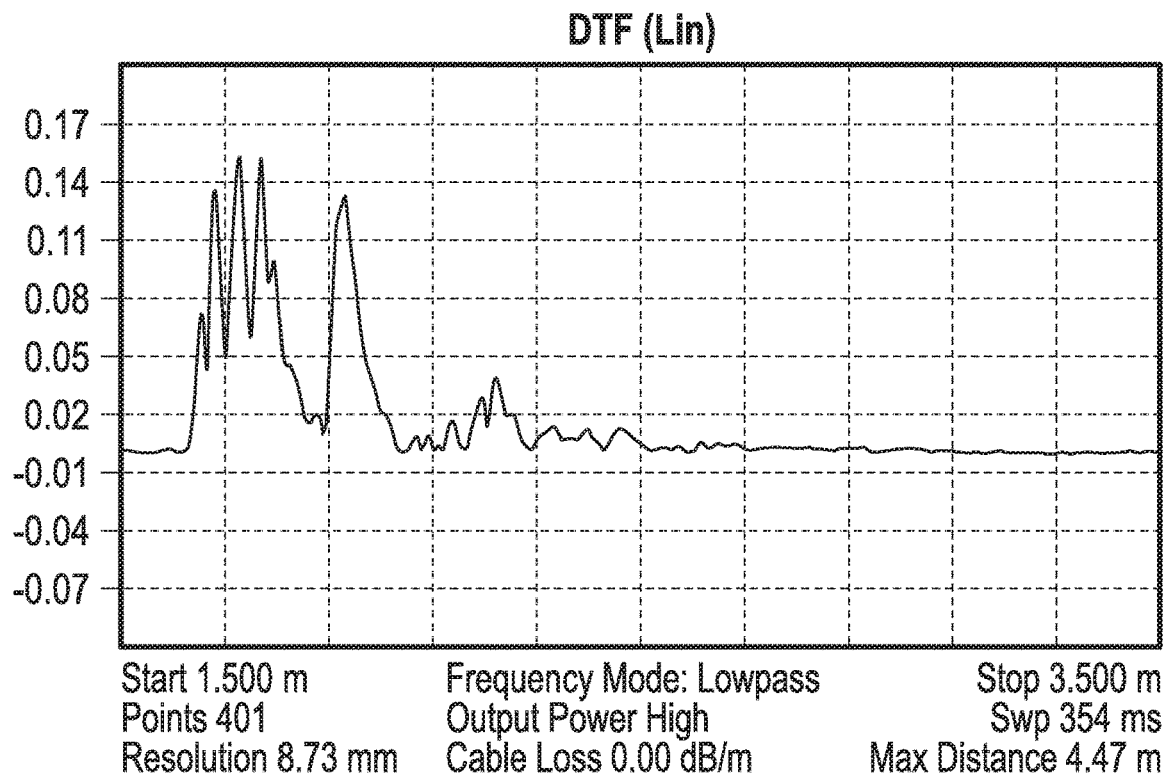
FIG. 8A illustrates an exemplary chart of a signal trace through a voided space in a process connector, in accordance with the disclosed embodiments.
Figure 8B:
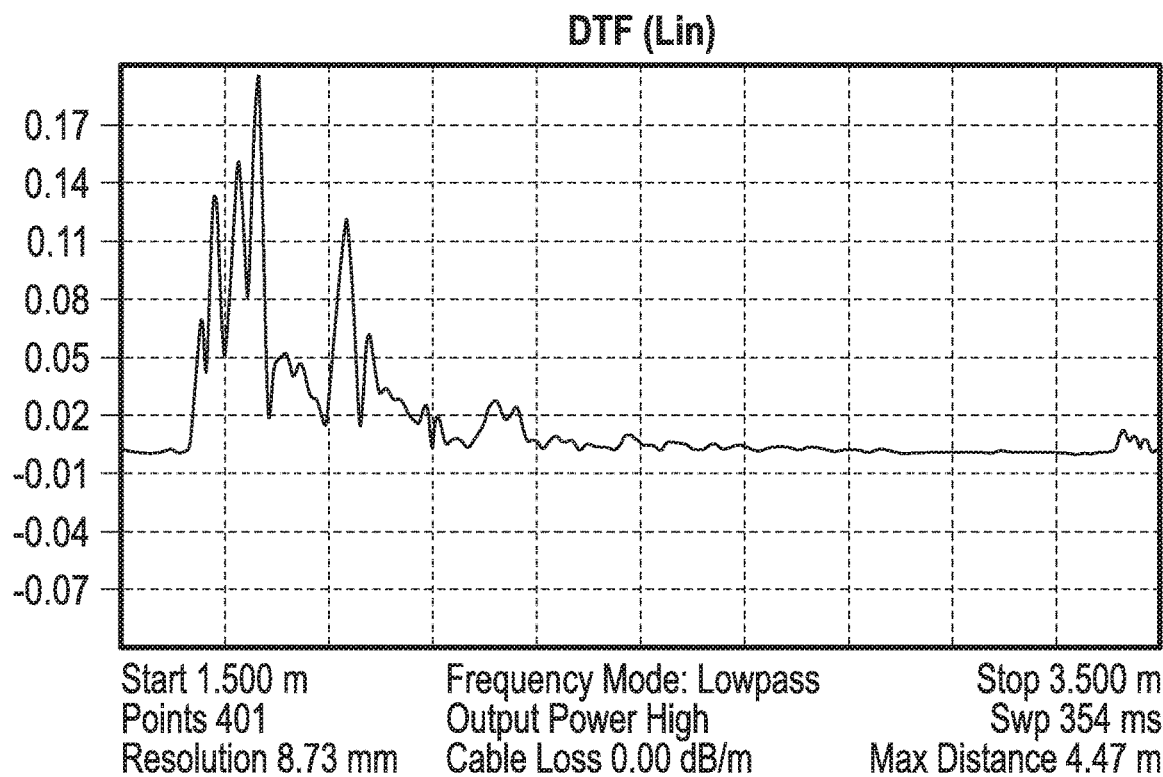
FIG. 8B illustrates an exemplary chart of a signal trace through a voided space in a process connector that has been filled, in accordance with the disclosed embodiments.

Echo Curve 422 has a characteristic shape when process connector 410 is empty. FIG. 8A illustrates a characteristic trace of an echo curve in process connector 410 where the void space in the process connector 410 is empty (i.e., the dielectric constant is 1). However, in the case where a seal in process connector 410 has been breached and product 404 has entered process connector 410, the impedance of the voided section of the process connector 410 will change, causing the shape of the echo curve 422 to change. FIG. 8B shows a trace of a signal passed through process connector 410 where the voided space has been filled with a product 404 (dielectric constant of approximately 2.8), The dielectric constants are provided to be exemplary. The method could similarly be used with product 404 having virtually any dielectric constant not equal to 1 because the impedance of the voided section of the process connector 410, and thus the shape of the echo curve 422, depends, in part, on the dielectric constant of the material through which the pulse travels.

Logic unit 418 can be configured to evaluate signals (or pulses) received by receiver 414, such as echo curve 422, to determine if a primary seal in the process connector 410 has been breached. For example, pulse generation module 420 can periodically generate a series of interrogation pulses 408. When the voided space in process connector 410 is empty, the received pulses will result in an echo curve 422 that will match, or be similar to, the curve shown in FIG. 8A. However, if a primary seal in the process connector fails and material begins to leak into the voided space in process connector 410, the echo curve 422 will change its shape as shown in FIG. 8B.

Figure 5:
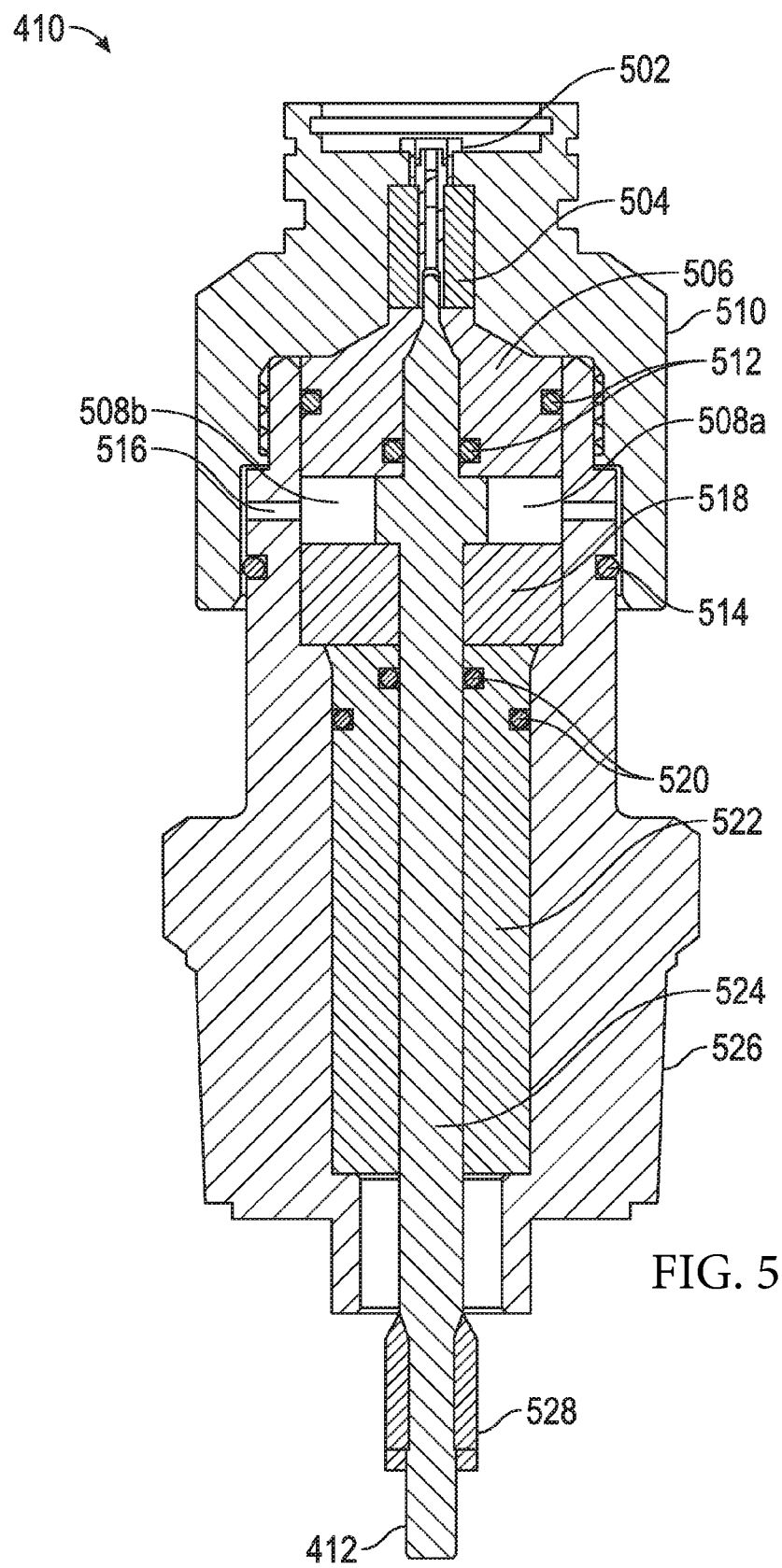
FIG. 5 illustrates a detailed view of a process connector, in accordance with the disclosed embodiments.

Logic unit 418 is configured to recognize that when the shape of the echo curve 422 does not match the characteristic shape, process connector 410 has a breached seal. In some embodiments, the shape of the echo curve 422 will only change in a specific region. Thus, in those embodiments the comparison of the echo curve to a characteristic echo curve may be limited to a certain portion of the echo curve. At this point, logic unit 418 can raise a flag 426 to annunciate a seal failure. A flag 426 can be provided to a computer system 110 which is preferably being monitored by an operator or can send the alarm to an operator. Alternatively or additionally, a flag 426 can be provided to any other alarm device. The alarm may be an audible or visual alarm, FIG. 5 shows a detailed view of a process connector 410 in association with embodiments of the present invention. Process connector 410 includes a radio frequency (RF) connector 502 and dielectric rod 504.

Because of the potential that a breach in process connector 410 could result in a leak of dangerous materials, many process connectors require dual seals. A secondary seal body 506 is shown just above voids 508a and 508b. The secondary seal is a fail safe to prevent leakage into the transmitter and into the conduit in the event the primary seal is breached. Cap 510 is located on the outside of secondary seal body 506 and a secondary o-ring arrangement 512 is located in the inner portion of seal body 506 between the central conductor 524.

An environmental seal 514 is just below voids 508a and 508b and is proximal to vent 516. The environmental seal is designed to prevent environmental contaminants from entering the process connector 410. The environmental seal 514 is designed to rupture at a certain pressure, providing an additional visual indication of primary seal failure.

A load ring 518 is located just above the primary o-ring arrangement 520. The primary seal body 522 encircles central conductor 524. The primary seal is the first seal between the potentially hazardous product contained in the tank and the process connector 410. The primary seal body 522 extends down through much of the process connector 410 and is preferably designed to be robust enough to withstand a variety of potentially hazardous materials. If the primary seal fans, product from the tank may begin to flood voids 508a and 508b. A preferred embodiment of the invention is intended to identify primary seal failure and produce an alarm indicating that the primary seal has failed before the product breaches the secondary seal.

The process connector 410 is enclosed in main body 526, which may be threaded or flanged depending on design considerations. Main body 526 can be formed to engage a threaded or flanged port on tank 406. When main body 526 engages the port on tank 406, process connector 410 is properly positioned and ready for use. The probe nut 528 fits around probe 412 which extends out of process connector 410 and into tank 406. The probe 412 may be configured as any vehicle through which signals are transmitted into tank 406, in order to conduct level measurements using guided wave radar.

Figure 6:
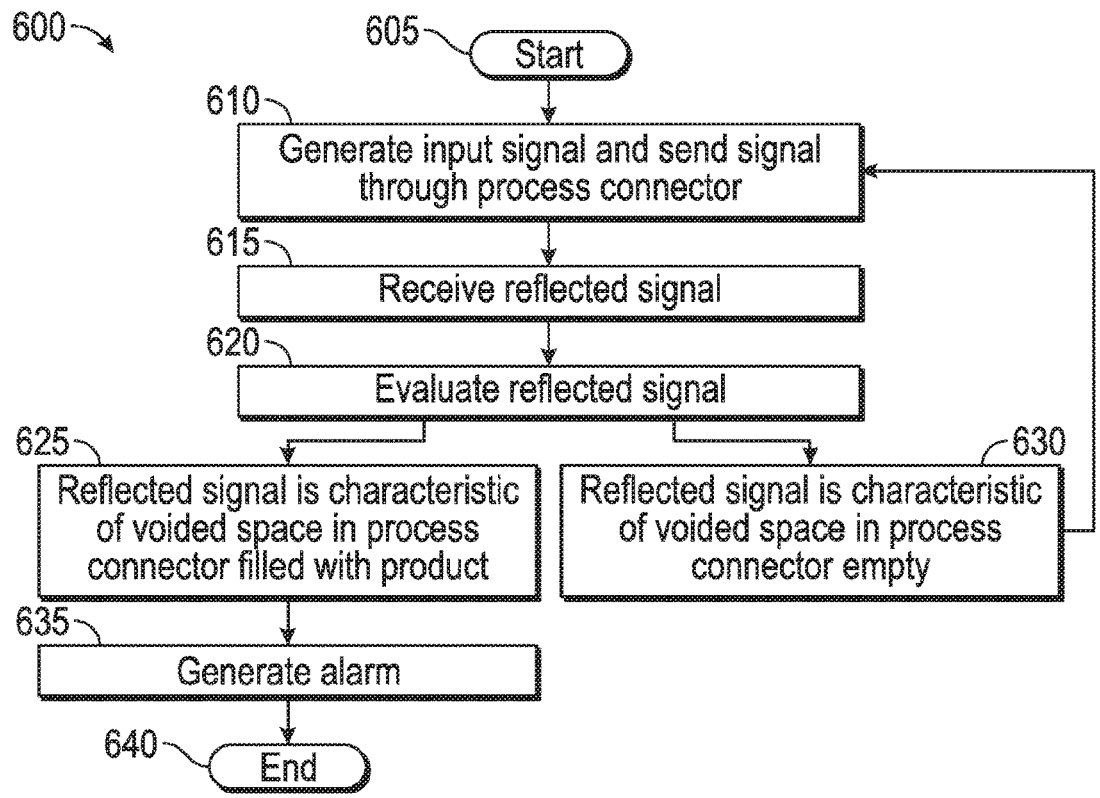
FIG. 6 illustrates a flow chart of logical operational steps associated with a method for annunciating a seal failure in a process connector, in accordance with the disclosed embodiments.

FIG. 6 illustrates a high level flow chart 600 of logical operational steps associated with a method for annunciating a primary seal failure in a process connector using guided wave radar in accordance with an embodiment of the invention. The method begins at step 605.

A pulse generator module 420 can periodically receive a control signal 428 from an MCU 424 to generate an interrogation pulse 408, as illustrated by step 610. The duration of the pulse 408 can vary depending on design considerations, but is preferably 0.05-1 nanoseconds long. It should be appreciated that pulse 408 may also be a series of pulses 408 produced in rapid succession. Each of the individual pulses in the series of pulses is sampled at a successive point in time, thus sampling at different distances. The resulting combination of output pulses, or echo curve 422, are then representative of the pulses at many different sampling distances in the process connector 410. This technique is commonly known as equivalent time sampling.

In alternative embodiments, the interrogation pulse 408 may be the same pulse or pulses that are being used to measure the level of product 404 in tank 406. This pulse 408 propagates through the voided space 508a and 508b of a process connector 410. An echo curve 422 of the signal is reflected back to a receiver 416 and is captured by the receiver at step 615, which also receives a control signal from MCU 424.

Echo curve 422 is evaluated by a logic module 418 at step 620. The logic module 418 determines if the echo curve 422 is characteristic of the voided space 508a and 508b in process connector 410 being empty, as shown at step 630, or if the reflected pulse is characteristic of the voided space 508a and 508b having some product 404 in it, as shown at step 625.

In the event that the evaluation indicates that the process connector 410 has product 404 in it, the logic module sounds an alarm, as shown at step 635 indicating that a primary seal in process connector 410 has been breached and the method ends at step 640. If however, the evaluation indicates that the process connector 410 does not have product 404 in it, the method periodically cycles back to step 610. The periodic cycle can be automatically initiated on a predetermined interval according to user preference, or each cycle can be initiated manually.

Figure 7:
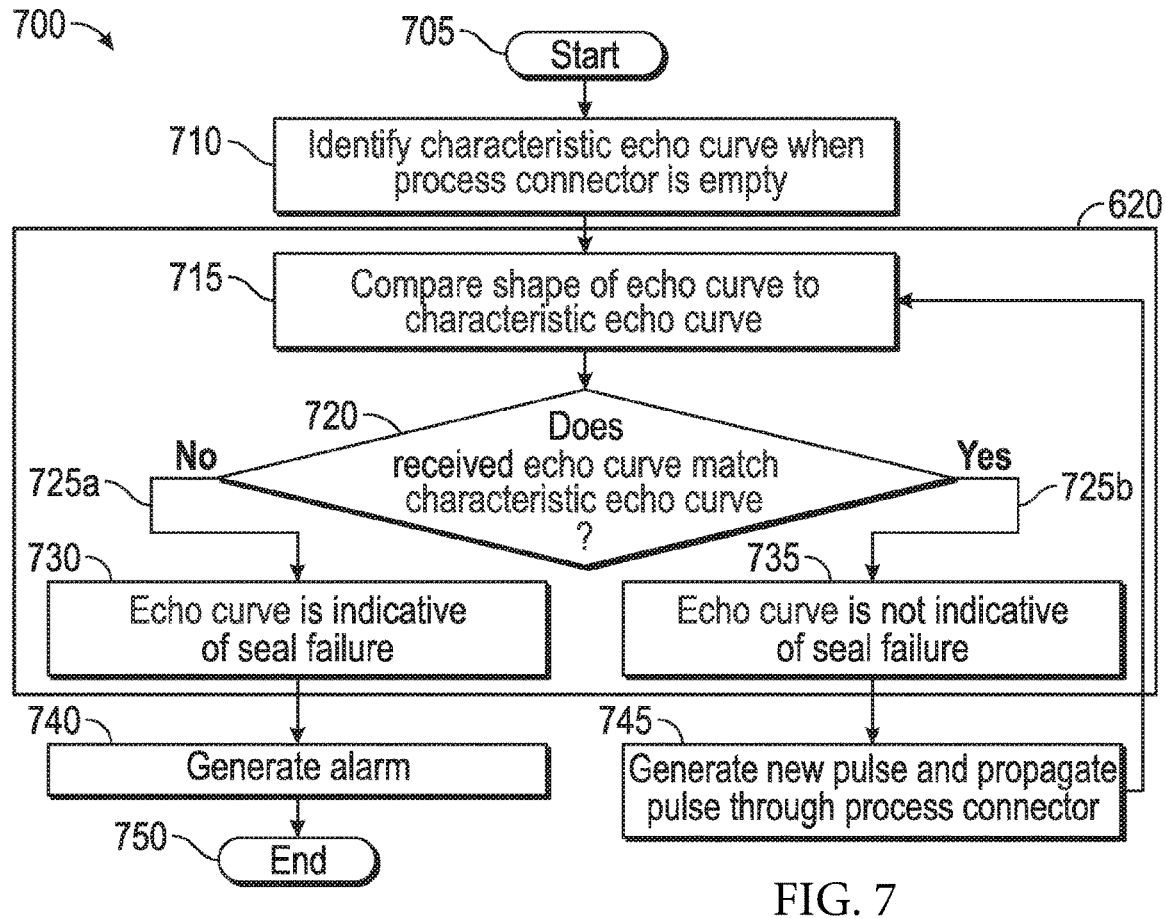
FIG. 7 illustrates a flow chart of logical operational steps associated with an alternative method for annunciating a seal failure in a process connector, in accordance with the disclosed embodiments.

FIG. 7 is a high level flow chart 700 of logical operational steps associated with a method for annunciating a primary seal failure in a process connector 410 using guided wave radar in accordance with an alternative embodiment of the invention. The method begins at step 705.

At step 710, a characteristic or baseline echo curve can be used to identify a characteristic impedance of the process connector 410. This can be accomplished in several ways. In one embodiment, a test pulse, or a series of test pulses, can be transmitted through voids 508a and 508b, while voids 508a and 508b are known to be empty in order to determine a characteristic or baseline echo curve. In a preferred embodiment, the impedance of the voided section of the process connector can be determined. Alternatively, other features of the signal may be used, depending on design considerations. The baseline or characteristic impedance of the process connector 410 can be saved in the logic module 418.

Alternatively or additionally at step 710, a baseline or characteristic impedance threshold can be set. The impedance threshold can be a limit under which any changes in process connector 410 impedance is deemed indicative of voids 508a and 508b being flooded, and therefore further indicative of primary seal failure. The characteristic impedance threshold can be stored in the logic module 418.

In another embodiment, the method steps 700 as illustrated in FIG. 7 can be followed, with the additional requirement that the first interrogation pulse or set of interrogation pulses, are propagated while voids 508a and 508b are known to be empty. In this embodiment, upon each iteration, the echo curve 422 and preferably the impedance associated with the process connector 410 can be stored in logic module 418. In this embodiment, the most recent stored shape of the echo curve 422 can serve as the characteristic or baseline for comparison against the next echo curve 422. After the comparison is completed, the newly received echo curve 422 is saved as the characteristic echo curve and the previous echo curve is discarded.

FIG. 7 illustrates detailed steps 715-735 associated with step 620 of FIG. 6. After the characteristic impedance is stored at step 710, the evaluation of the reflected pulse or set of pulses at step 620 is initiated. Step 620 includes first comparing the received echo curve 422 to the stored baseline or characteristic echo curve as shown at step 715. In a preferred embodiment, the shape of the echo curve 422 is compared to the shape of the characteristic echo curve, Changes in echo curve shape in the region of the voided section of the process connection are due to changes in the process connector impedance due to the void being filled with a product with a different dielectric constant.

Next at step 720, the logic module 418 compares the echo curve 422 to the characteristic echo curve. If the received echo curve matches the characteristic echo curve as shown by step 725b, the received echo curve is determined not to be indicative of primary seal failure at step 735. A new pulse of set of pulses is generated at step 745 and the method cycles back to step 715. If the echo curve does not match the characteristic echo curve as shown by step 725a, then the received echo curve is determined to be indicative of primary seal failure as shown at step 730. At step 740, an alarm signal is then generated and the method ends at step 750.

It should be appreciated that in an alternative embodiment the steps illustrated in FIG. 7 may be similarly applied using the impedance of the process connector which can be determined from the echo curve. Specifically, at step 710 the impedance of the process connector can be extracted from the echo curve when the process connector is empty. Next at step 715, the extracted impedance can be compared to a characteristic impedance. At decision block 720, if the impedance matches, or is within a tolerance to, the characteristic impedance at step 725b, then the impedance is not indicative of a seal failure at step 735, a new set of interrogation pulses is generated at step 745 and the method cycles back to step 715 for continued seal failure analysis.

However, if the impedance does not match, or is not within a tolerance to, the characteristic impedance at step 725a, the impedance is indicative of a seal failure at step 730, and an alarm is generated at step 740.

Based on the foregoing, it can be appreciated that a number of embodiments, preferred and alternative, are disclosed herein. For example, in one embodiment, a seal failure annunciation system comprises a process connector connected to a probe used to measure a product level in a tank; a pulse generation module wherein the pulse generation module generates a plurality of pulses that are propagated through a voided space in the process connector; a detector module configured to receive the plurality of pulses as an echo curve; a logic module configured to evaluate the echo curve to determine if a seal in the process connector has failed; and an alarm module configured to initiate an alarm indicating the seal in the process connector has failed.

In an alternative embodiment, the voided space in the process connector comprises a space between a first seal and a second seal in the process connector. The pulse duration between the plurality of pulses is between 0.05 nanoseconds and 1.0 nanoseconds.

In another embodiment, the logic module is configured to evaluate the echo curve by comparing a shape of the echo curve to a baseline echo curve wherein a difference in the shape of a specific region of the echo curve is indicative of a change in the process connector caused by failure of the first seal. Alternatively, the logic module is configured to evaluate the echo curve by comparing a shape of the echo curve to a shape of a previously received echo curve wherein a difference in the shape of a specific region of the echo curve is indicative of a change in the process connector caused by failure of the first seal. In another embodiment, the pulse generated by the pulse generator module is further provided to the probe for measurement of the product level in the tank.

In another embodiment, a method for seal failure annunciation comprises generating a plurality of pulses that are propagated through a voided space in a process connector; detecting the plurality of pulses as an echo curve after they have propagated through the process connector; evaluating the received pulse to determine if a seal in the process connector has failed; and initiating an alarm indicating the seal in the process connector has failed according to the evaluation.

In another embodiment of the method, the voided space in the process connector comprises a space between a first seal and a second seal in the process connector. The pulse duration between the plurality of pulses is between 0.05 nanoseconds and 1.0 nanoseconds.

In an alternative embodiment, evaluating the echo curve further comprises: comparing a shape of the echo curve to a baseline echo curve wherein a difference in a shape of said echo curve in a specific region and the baseline echo curve is indicative of a change in the process connector caused by a failure of the first seal. Alternatively, evaluating the echo curve further comprises comparing an echo curve to a previously received echo curve wherein a difference in a shape of the echo curve and a shape of the previously received echo curve is indicative of a change in the process connector caused by a failure of the first seal. The pulse is further provided to a probe for measurement of a product level in a tank connected to the process connector.

In yet another embodiment, a seal failure annunciation apparatus comprises a process connector connected to a probe used to measure a product level in a tank; a computer comprising a processor and non-transitory instruction media wherein the non-transitory instruction media is configured to instruct a pulse generation module to generate a plurality of pulses wherein the plurality of pulses are propagated through a voided space between a first seal and a second seal in the process connector, instruct a detector module to receive an echo curve associated with the plurality of pulses after it has propagated through the process connector, evaluate the echo curve to determine if a seal in the process connector has failed; and initiate an alarm with an alarm module indicating the seal in the process connector has failed. The plurality of pulses generated by the pulse generator module is further provided to the probe for measurement of the product level in the tank.

In another embodiment, the logic module is configured to evaluate the echo curve by comparing a shape of the echo curve to a shape of a baseline echo curve wherein a difference in the shape of said received echo curve and the shape of the baseline echo curve is indicative of a change in the process connector caused by failure of the first seal.

Alternatively, the logic module is configured to evaluate the received echo curve by comparing the shape of the received echo curve to a shape of a previously received echo curve wherein a difference in the shape of the received echo curve and the shape of the previously received echo curve is indicative of a change in the process connector caused by failure of the first seal.

It will be appreciated that variations of the above-disclosed and other features and functions, or alternatives thereof, may be desirably combined into many other different systems or applications. Also, various presentlyl unforeseen or unanticipated alternatives, modifications, variations or improvements therein may be subsequently made by those skilled in the art which are also intended to be encompassed by the following claims.

What is claimed is:

1. A seal failure detection system, comprising:
a process connector in a transmitter, connected to a probe that measures a product level in a tank;
a primary seal extending through the process connector;
a pulse generation module wherein said pulse generation module generates a plurality of pulses that are propagated through the probe from said process connector into a voided space in the process connector, wherein the voided space is formed between a secondary seal body and an environmental seal;
a detector module operable to receive said plurality of pulses, wherein said plurality of pulses is sampled at successive points in time resulting in an echo curve that is representative of a distance of the voided space from the process connector;
a logic module operable to evaluate said echo curve to determine whether the product has entered the voided space in the process connector and determine if the primary seal in said process connector has failed, wherein the secondary seal prevents entry of the product in the transmitter through the process connector; and
an alarm module operable to initiate an alarm indicating said primary seal in said process connector has failed.

2. The system of claim 1 wherein said alarm comprises at least one flag to annunciate a seal failure condition transmitted through a network to a computer system monitored by an operator.

3. The system of claim 1 wherein a pulse duration between said plurality of pulses is between 0.05 nanoseconds and 1.0 nanoseconds.

4. The system of claim 3, wherein said logic module is operable to evaluate said echo curve by comparing a shape of said echo curve to a baseline echo curve wherein a difference in said shape of said echo curve is indicative of a change in said process connector caused by failure of said primary first seal.

5. The system of claim 3, wherein said logic module is operable to evaluate said echo curve by comparing a shape of said echo curve to a shape of a previously received echo curve wherein a difference in said shape of said echo curve is indicative of a change in said process connector caused by failure of said primary first seal.

6. The system of claim 1 wherein said pulse generated by said pulse generator module is further provided to said probe for measurement of said product level in said tank.

7. A method for seal failure detection, comprising:
generating a plurality of pulses that are propagated through the probe from a process connector in a transmitter, into a voided space in a process connector, wherein the voided space is formed between a secondary seal body and an environmental seal, wherein the process connector has a primary seal extending through the process connector;
detecting said plurality of pulses, wherein said plurality of pulses is sampled at successive points in time after they have propagated through said process connector wherein said plurality of pulses results in an echo curve representative of a distance of the voided space from the process connector;
evaluating said echo curve to determine whether the product has entered the voided space in the process connector and thereby determine if the primary seal in said process connector has failed, wherein the secondary seal prevents entry of the product in the transmitter through the process connector; and
initiating an alarm indicating said seal in said process connector has failed according to said evaluating.

8. The method of claim 7 wherein said alarm comprises at least one of a visual alarm and an audible alarm.

9. The method of claim 8 wherein said pulse is further provided to a probe for measurement of a product level in a tank connected to said process connector.

10. The method of claim 7 wherein said pulse is of a certain duration.

11. The method of claim 10 wherein a pulse duration between said plurality of pulses is between 0.05 nanoseconds and 1.0 nanoseconds.

12. The method of claim 11, wherein evaluating said echo curve further comprises:
comparing a shape of said echo curve to a baseline echo curve wherein a difference in said shape of said echo curve and said baseline echo curve is indicative of a change in said process connector caused by a failure of said primary seal.

13. The method of claim 11, wherein evaluating said echo curve further comprises:
comparing said echo curve to a previously received echo curve wherein a difference in said shape of said echo curve and a shape of said previous echo curve is indicative of a change in said process connector caused by a failure of said primary seal.

* * * * *